(12) United States Patent
Nishigaki

(10) Patent No.: US 7,908,074 B2
(45) Date of Patent: Mar. 15, 2011

(54) ABNORMALITY DETECTING DEVICE OF VEHICLE

(75) Inventor: Takahiro Nishigaki, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 921 days.

(21) Appl. No.: 11/579,537

(22) PCT Filed: Feb. 28, 2006

(86) PCT No.: PCT/JP2006/304228
§ 371 (c)(1),
(2), (4) Date: Nov. 3, 2006

(87) PCT Pub. No.: WO2006/093312
PCT Pub. Date: Sep. 8, 2006

(65) Prior Publication Data
US 2008/0071441 A1   Mar. 20, 2008

(30) Foreign Application Priority Data
Mar. 2, 2005 (JP) ................................ 2005-057384

(51) Int. Cl.
*B60T 7/12* (2006.01)
*G05D 1/00* (2006.01)

(52) U.S. Cl. ............ 701/105; 123/478; 701/34; 701/29; 477/127; 73/117.3

(58) Field of Classification Search .................... 701/66, 701/102, 10, 5, 110, 29, 113–114, 105, 34; 73/117.3; 123/90.15, 445–448, 406, 478, 123/492, 406.18, 406.61, 679, 685; 447/127; 477/127
See application file for complete search history.

(56) References Cited

U.S. PATENT DOCUMENTS
4,947,816 A * 8/1990 Nakaniwa et al. ....... 123/406.46
(Continued)

FOREIGN PATENT DOCUMENTS
JP          57-159446      * 9/1982
(Continued)

OTHER PUBLICATIONS
Mechanical signature analysis using time-frequency signal processing: application to internal combustion engine knock detection; Samimy, B.; Rizzoni, G.; Proceedings of the IEEE; vol. 84, Issue 9, Sep. 1996 pp. 1330-1343 Digital Object Identifier 10.1109/5.535251.*

(Continued)

Primary Examiner — Cuong H Nguyen
(74) Attorney, Agent, or Firm — Oliff & Berridge, PLC

(57) ABSTRACT

An ECU executes a program including the steps of detecting an engine speed, determining whether the engine speed is at least a threshold value or not, detecting a VVT advance angle calculation count after restarting the engine, determining whether a VVT advance angle calculation count is at least a threshold value or not, detecting a VVT advance angle amount, determining whether the VVT advance angle amount is at least a threshold value or not, determining whether the engine is in a stop sequence or not, setting a VVT abnormality determination permission flag to detect a VVT displacement amount if the engine speed is at least the threshold value, the VVT advance angle calculation count is at least the threshold value, the VVT advance angle amount is at least the threshold value, and the engine is not in the stop sequence, and determining that the VVT is abnormal if the VVT displacement amount is less than a criterion threshold value.

8 Claims, 2 Drawing Sheets

U.S. PATENT DOCUMENTS

| | | | | |
|---|---|---|---|---|
| 4,960,094 | A * | 10/1990 | Koike et al. | 123/406.13 |
| 5,068,794 | A * | 11/1991 | Hosaka | 701/104 |
| 5,137,000 | A * | 8/1992 | Stepper et al. | 123/478 |
| 5,241,937 | A * | 9/1993 | Kanehiro et al. | 123/406.27 |
| 5,375,416 | A * | 12/1994 | Iwata et al. | 60/276 |
| 5,396,873 | A * | 3/1995 | Yamanaka et al. | 123/520 |
| 5,415,142 | A * | 5/1995 | Tsubakiji et al. | 123/336 |
| 5,439,426 | A * | 8/1995 | Nakashima | 701/57 |
| 5,562,570 | A * | 10/1996 | Nakashima | 477/127 |
| 5,619,976 | A * | 4/1997 | Kitagawa et al. | 123/679 |
| 5,644,073 | A * | 7/1997 | Matsuno et al. | 73/114.79 |
| 6,083,139 | A * | 7/2000 | Deguchi et al. | 477/5 |
| 6,175,785 | B1 * | 1/2001 | Fujisawa et al. | 701/22 |
| 6,775,611 | B2 * | 8/2004 | Kobayashi et al. | 701/114 |
| 6,871,633 | B1 * | 3/2005 | Date et al. | 123/447 |
| 7,025,050 | B2 * | 4/2006 | Oono et al. | 123/690 |
| 7,036,358 | B2 * | 5/2006 | Nisimura | 73/114.63 |
| 7,066,149 | B1 * | 6/2006 | Date et al. | 123/457 |
| 7,191,054 | B2 * | 3/2007 | Machida | 701/114 |
| 7,363,920 | B2 * | 4/2008 | Ueno | 123/679 |
| 7,607,415 | B2 * | 10/2009 | Mathews et al. | 123/406.18 |
| 7,726,284 | B2 * | 6/2010 | Hori | 123/501 |
| 2003/0163247 | A1 * | 8/2003 | Kobayashi et al. | 701/114 |
| 2004/0187566 | A1 * | 9/2004 | Nisimura | 73/117.3 |
| 2005/0027432 | A1 * | 2/2005 | Machida | 701/107 |
| 2008/0071441 | A1 * | 3/2008 | Nishigaki | 701/29 |

FOREIGN PATENT DOCUMENTS

| | | | |
|---|---|---|---|
| JP | 62-269467 | * | 10/1987 |
| JP | 1-110566 | * | 4/1989 |
| JP | A 2000-64862 | | 2/2000 |
| JP | A 2000-110594 | | 4/2000 |
| JP | A 2003-239773 | | 8/2003 |
| JP | 2004-160022 | * | 3/2004 |
| JP | A 2004-116405 | | 4/2004 |
| JP | 2004-153448 | * | 5/2004 |
| JP | A 2004-293520 | | 10/2004 |
| JP | A 2005-16383 | | 1/2005 |
| JP | P2005-015580 | * | 1/2005 |
| JP | 2005-350316 | * | 12/2005 |

OTHER PUBLICATIONS

Self-organizing maps for automatic fault detection in a vehicle cooling system; Svensson, M.; Byttner, S.; Rognvaldsson, T.; Intelligent Systems, 2008. IS '08. 4th International IEEE Conference; vol. 3, Sep. 6-8, 2008 pp. 24-8-24-12 Digital Object Identifier 10.1109/IS.2008.4670481.*

Operational experience with intelligent software agents for shipboard diesel and gas turbine engine health monitoring; Logan, K.P.; Electric Ship Technologies Symposium, 2005 IEEE; Jul. 25-27, 2005 pp. 184-194; Digital Object Identifier 10.1109/ESTS.2005.1524673.*

Sliding Mode Observer for Internal Combustion Engine Misfire Detection; Molinar-Monterrubio, J.; Linares, R.C.; Electronics, Robotics and Automotive Mechanics Conference, 2007. CERMA 2007; Sep. 25-28, 2007 pp. 620-624 Digital Object Identifier 10.1109/CERMA.2007.4367756.*

Systematic Data-Driven Approach to Real-Time Fault Detection and Diagnosis in Automotive Engines; Namburu, S.M.; Wilcutts, M.; Chigusa, S.; Liu Qiao; Kihoon Choi; Pattipati, K.; Autotestcon, 2006 IEEE Sep. 18-21, 2006 pp. 59-65; Digital Object Identifier 10.1109/AUTEST.2006.283654.*

Optimisation of valve timing events of internal combustion engines with particle swarm optimisation; Ratnaweera, A.; Watson, H.C.; Halgamuge, S.K.; Evolutionary Computation, 2003. CEC '03. The 2003 Congress on, vol. 4, Dec. 8-12, 2003 pp. 2411-2418 vol. 4; Digital Object Identifier 10.1109/CEC.2003.1299390.*

Servo control design for electronic throttle valve with nonlinear spring effect; Chwan-Hsen Chen; Hsu-Lun Tsai; Yu-Sen Lin; Advanced Motion Control, 2010 11th IEEE International Workshop on; Digital Object Identifier: 10.1109/AMC.2010.5464020 Publication Year: 2010 , pp. 88-93.*

Design of technical condition monitoring system of vehicle based on CAN Bus; Ruili Zeng; Yunkui Xiao; Wenjun Dai; Bin Zhou; Lingling Zhang; Computer Science and Information Technology (ICCSIT), 2010 3rd IEEE International Conference on vol. 1; Digital Object Identifier: 10.1109/ICCSIT.2010.5565094; Publication Year: 2010 , pp. 457-460.*

The Lean Burn Control for LPG Engine Using Torque Estimation; Jing Hu; Bing Xiao; Fei Luo; Control and Automation, 2007. ICCA 2007. IEEE International Conference on; Digital Object Identifier: 10.1109/ICCA.2007.4376624; Publication Year: 2007 , pp. 1570-1574.*

Timing analysis of worst case with direct NM of OSEK NM; Chang-Wan Son; Jin-Ho Kim; Tae-Yoon Moon; Key-Ho Kwon; Sung-Ho Hwang; Jae-Wook Jeon; Control, Automation and Systems, 2008. ICCAS 2008. International Conference on; Digital Object Identifier: 10.1109/ICCAS.2008.4694566; Publication Year: 2008 , pp. 563-568.*

Hydrogen safety monitoring on Challenge X vehicle; Hines, J.; Barrett, S.; Electrical Power & Energy Conference (EPEC), 2009 IEEE; Digital Object Identifier: 10.1109/EPEC.2009.5420967; Publication Year: 2009 , pp. 1-5.*

Component-based ECU design method of passenger car information integrated control system; Jian Hu; Gangyan Li; Jun Xu; Automation and Logistics, 2009. ICAL '09. IEEE International Conference on; Digital Object Identifier: 10.1109/ICAL.2009.5262898; Publication Year: 2009 , pp. 365-370.*

Nonlinear Compensation using Bypassed Delta-Sigma Modulation for Variable Valve Actuation; Shimojo, K.; Yasui, Y.; American Control Conference, 2007. ACC '07; Digital Object Identifier: 10.1109/ACC.2007.4282323; Publication Year: 2007 , pp. 3813-3818.*

Speed control of vehicles with variable valve lift engine by nonlinear MPC; Murayama, A.; Yamakita, M.; ICCAS-SICE, 2009 Publication Year: 2009 , pp. 4128-4133.*

* cited by examiner

ABNORMALITY DETECTING DEVICE OF VEHICLE

TECHNICAL FIELD

The present invention relates to an abnormality detecting device of a vehicle that temporarily stops the engine when a predetermined condition is satisfied during idling, and particularly to a detecting device that is capable of accurately detecting an abnormality of a variable valve timing (VVT) mechanism.

BACKGROUND ART

From the viewpoint of global warming prevention and resource saving, an idling stop system (which is also referred to as an economy running system or an engine automatic stop-start system, and hereinafter may be referred to as an eco run system) has been in practical use. The idling stop system automatically stops the engine when the vehicle stops at a red light at an intersection or the like, and restarts the engine when the driver performs an operation to restart the vehicle (for example, presses an accelerator pedal, stops pressing a brake pedal, or moves a shift lever to a forward driving position). When the engine is to be restarted, the system uses power from a secondary battery mounted on the vehicle to rotate a crankshaft by means of an electric motor such as a motor generator or a starter motor to restart the engine.

In such an eco run system, control must be effected to detect various sensor signals and switch signals, stop the engine when a predetermined condition for starting eco run is satisfied, and then restart the engine.

On the other hand, the engine mounted on such an eco run vehicle is often provided with a VVT. There is an example of the VVT that attempts to improve the torque at low-to-middle speed, the fuel efficiency and the emission performance by performing a continuous variable control of the open/close timing of an intake valve and/or exhaust valve by means of an electronically controlled hydraulic drive. In addition to this timing control, there is another example that variably controls the lift amount of the intake valve and/or exhaust valve in order to improve the intake/exhaust efficiency. The VVT is to control the intake/exhaust valve which is the base component of the engine, and requires abnormality diagnosis in case of a failure.

Japanese Patent Laying-Open No. 2004-293520 discloses an abnormality diagnosis device that operates to enlarge the region in which abnormality diagnosis is carried out for a valve timing control system, and that quickly and reliably detects an abnormality. The abnormality diagnosis device functions to diagnose an abnormality of the valve timing control system adjusting the rotation phase between a crankshaft and a camshaft of the engine, and includes means for detecting a change in engine speed associated with the change in the driving conditions to calculate a diagnosis value based on the change in the engine speed, and means for comparing the diagnosis value with a predetermined criterion threshold value to determine that an abnormality occurs when the diagnosis value exceeds the criterion threshold value.

According to the abnormality diagnosis device of the valve timing control system, when the amount of change in the engine speed (or an integration value of the amount of change in the engine speed) corresponding to a change in the operating conditions exceeds the criterion threshold value, the valve timing control system is diagnosed as abnormal. Thus, irrespective of the operating region, a decrease in the response can be quickly and reliably detected, which is caused by a sliding failure or adhesion of a sliding part of the variable valve timing mechanism. Furthermore, not only in the case of adhesion or the state close to adhesion of the sliding part, but also in the case where the hydraulic pressure attaining a level higher than that defined causes a delay in the response of the variable valve timing mechanism to lead to a decrease in the response of the actual advance angle relative to the target advance angle, abnormality can be accurately detected to improve diagnostic accuracy.

However, when stopping the engine, if the engine is stopped in the compression stroke, pistons may be pushed back by compressed air. This is more likely to occur especially in the eco run vehicle because the engine is frequently stopped and restarted in the eco run vehicle. If the pistons are pushed back by compressed air as described above, it is assumed that an abnormality occurs in the VVT when an advance angle command is output from an Electronic Control Unit (ECU) to a VVT controller. This abnormality includes a decrease in the response caused by a sliding failure of each sliding part of the VVT which results from accumulation and deposition and the like of foreign matter due to impurities in the oil and deterioration thereof, adhesion caused by a foreign matter entering the sliding parts, and the like. If the VVT is in an abnormal state due to adhesion and the like when the advance angle command is output, there may be no displacement of the cam position to the advance angle by the VVT. In this case, the VVT should be determined to be abnormal. However, if the engine is stopped in the compression stroke, the pistons may be pushed back by compressed air to thereby slightly push the crankshaft in the reverse direction. On the other hand, since the camshaft is not rotated in the reverse direction, detection is made by a cam position sensor as if there is a relative VVT advance angle amount. This reverse movement of the crankshaft will cause detection as if the cam position advances, such that occurrence of abnormality cannot be detected. Therefore, the engine will be controlled assuming that there is no abnormality in the VVT when the engine is restarted.

DISCLOSURE OF THE INVENTION

An object of the present invention is to provide an abnormality detecting device of a vehicle which is capable of accurately detecting an abnormality of the VVT in the vehicle such as an eco run vehicle in which the engine is repeatedly stopped and restarted.

The abnormality detecting device of the vehicle according to the present invention detects an abnormality of the vehicle that temporarily stops the engine when the state of the vehicle satisfies a predetermined condition. The engine is provided with a variable valve timing mechanism. The abnormality detecting device includes a determination unit determining whether an abnormality detection inhibiting condition relating to a predetermined state of the engine is satisfied or not after the engine is temporarily stopped and then restarted, a detection unit detecting an abnormality of the variable valve timing mechanism, and an inhibition unit inhibiting detection of the abnormality of the variable valve timing mechanism by the detection unit when the abnormality detection inhibiting condition is satisfied according to the determination unit. The abnormality detection inhibiting condition is that engine speed is lower than predetermined engine speed.

According to the present invention, a condition (abnormality detection inhibiting condition) is set that inhibits detection of an abnormality of the VVT whose mechanism is provided in the engine of an eco run vehicle and a hybrid vehicle. In this vehicle which is more likely to frequently repeat stop and restart of the engine, the engine is stopped in the compression stroke and the compressed air pushes pistons to slightly rotate a crankshaft in the reverse direction, whereas a camshaft is not rotated in the reverse direction. Therefore, when there is an abnormality such as adhesion in the VVT mechanism in the event of an advance angle command signal being output, the cam position sensor will erroneously detect a false advance although there is actually no advance by the VVT. Therefore, when the crankshaft and the camshaft are not synchronized with each other as described above, the abnormality detection inhibiting condition is established to suppress determination of VVT abnormality. Thus, the abnormality of the VVT can be accurately detected. As a result, an abnormality detecting device of a vehicle can be provided which is capable of accurately detecting an abnormality of the VVT in the vehicle such as an eco run vehicle in which the engine is repeatedly stopped and restarted. In particular, when the engine speed is low (immediately after restarting the engine and immediately before stopping the engine), the crankshaft and the camshaft are not synchronized with each other, which results from the fact that the engine is stopped in the compression stroke, and therefore, the abnormality detection inhibiting condition is established to suppress determination of VVT abnormality.

Preferably, the abnormality detection inhibiting condition is that an output count of a control command to the variable valve timing mechanism is lower than a predetermined count after the engine is restarted.

According to the present invention, the cam position sensor detects the phase of the cam to calculate an advance angle amount and a retard angle amount. Since the cam position sensor cannot detect the phase of the cam unless the crankshaft is rotated at least once, a control command signal is also not output. On the other hand, the fact that the control command signal is output means that the phase of the cam has been detected at least once by the cam position sensor, at which time the adhesion can be detected. Therefore, until then, the abnormality detection inhibiting condition is established to suppress determination of VVT abnormality.

More preferably, the abnormality detection inhibiting condition is that a displacement amount in the control command to the variable valve timing mechanism is less than a predetermined amount after the engine is restarted.

According to the present invention, in the case where the engine is to be stopped, the accuracy of the abnormality detection can be improved by increasing the displacement amount.

More preferably, the abnormality detection inhibiting condition is that the engine is in a stop sequence.

According to the present invention, for example, when the idling stop condition of the eco run vehicle is established, the engine is in the stop sequence, and the engine speed is low (immediately before the engine is stopped, and the like), the crankshaft and the camshaft are not synchronized with each other, which results from the fact that the engine is stopped in the compression stroke. Therefore, the abnormality detection inhibiting condition is established to thereby suppress determination of VVT abnormality.

BEST MODES FOR CARRYING OUT THE INVENTION

Figure 1:
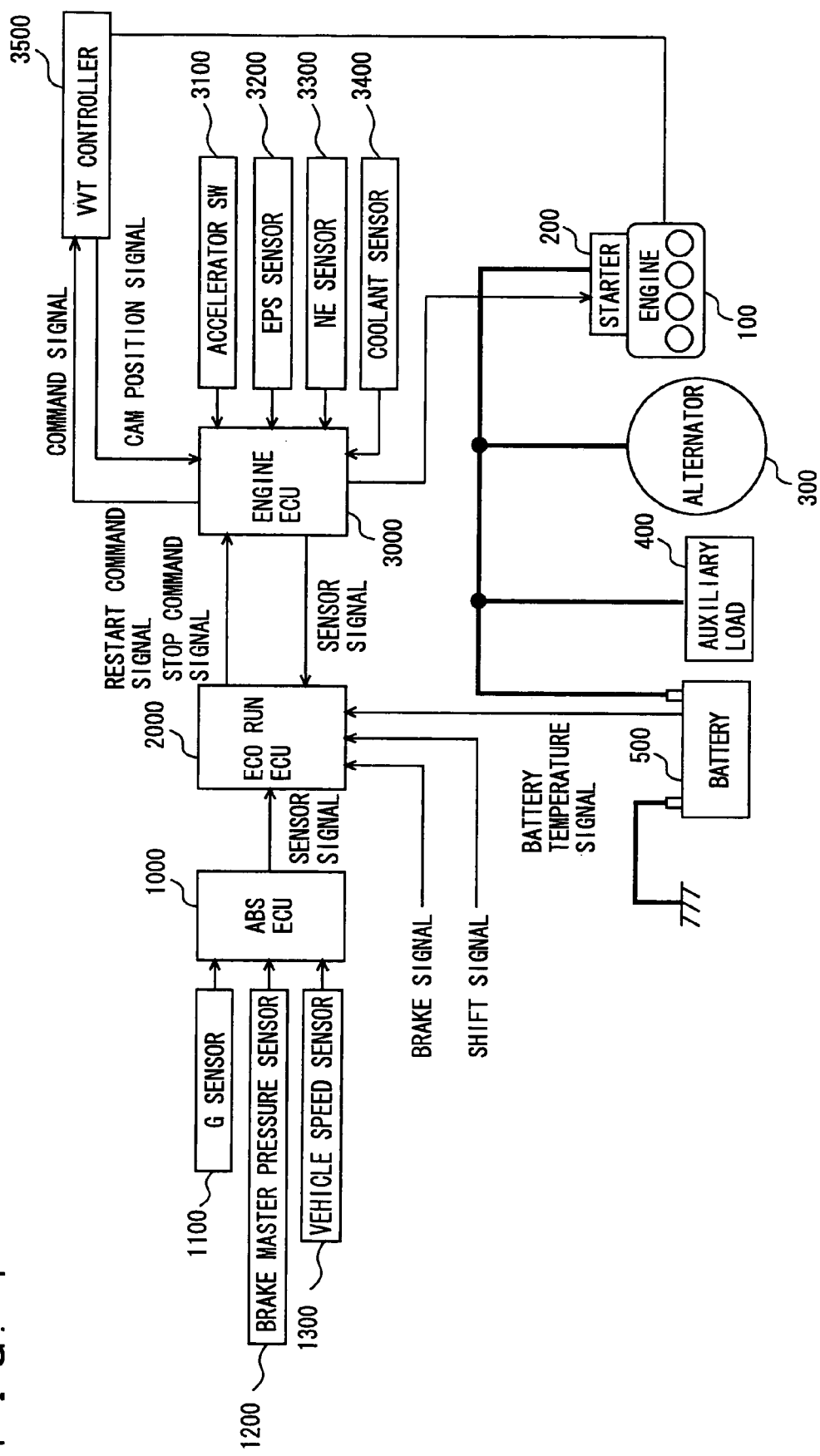
FIG. 1 is a control block diagram of a vehicle on which an abnormality detecting device according to the present embodiment is mounted.

An embodiment of the present invention will be described with reference to the drawings. In the description below, similar parts are denoted by the same reference characters, and have the same names and functions. Accordingly, the detailed description thereof will not be repeated. It is to be noted that, in the following embodiment, a command value of the VVT is described as an advance angle amount, although it may be a retard angle amount.

Referring to FIG. 1, a control block of a vehicle on which an abnormality detecting device according to an embodiment of the present invention is mounted will be described. In the following description, the abnormality detecting device is described as being applied to a vehicle in which an eco run system is incorporated. However, the vehicle to which the present invention is applied may be a vehicle that relatively frequently stops and restarts the engine as in a hybrid vehicle and the like.

The eco run system includes, as a hardware system to be controlled, an engine 100, a starter 200 for cranking engine 100 to start and restart engine 100 (starting of the operation of engine 100 with an ignition switch is referred to as start, and starting of the operation of engine 100 after a temporary stop by eco run is referred to as restart), an alternator 300 connected to a crankshaft pulley of engine 100 by a belt, an auxiliary load 400 such as a compressor of a light, an audio unit, or an air conditioner, a battery (secondary battery) 500 supplying power to starter 200 and auxiliary load 400, and a VVT controller 3500. Starter 200 may be replaced with a motor generator, and a battery for supplying power when engine 100 is stopped may further be mounted.

The eco run system includes, as a control system for controlling such a hardware system, an Antilock braking System (ABS)_Electronic Control Unit (ECU) 1000, an eco run ECU 2000, and an engine ECU 3000. VVT controller 3500 is controlled by engine ECU 3000.

A signal from a G sensor 1100 (a signal of a physical quantity representative of a tilt and an acceleration of the vehicle), a signal from a brake master pressure sensor 1200 (a signal of a physical quantity representative of how effectively a breaking device of the vehicle operates), and a signal from a vehicle speed sensor 1300 (a signal of a physical quantity representative of the speed of the vehicle) are each input into ABS_ECU 1000.

A brake signal indicating that a brake operating in conjunction with a brake lamp signal is active, a shift signal indicating a shift position of the transmission, and a battery temperature signal indicating the temperature of battery 500 are each input into eco run ECU 2000.

A signal from an accelerator switch 3100 detecting that the accelerator pedal is pressed, a signal from an Electric Power Steering (EPS) sensor 3200 detecting that a steering wheel is operated, a signal from an engine speed (NE) sensor 3300 detecting an NE of engine 100, a signal from a coolant sensor 3400 detecting the temperature of the coolant for cooling engine 100, and a cam position signal from a cam position sensor detecting the cam phase on the intake and exhaust sides from VVT controller 3500 are each input into engine ECU 3000.

Further, a sensor signal is sent from ABS_ECU 1000 to eco run ECU 2000, from which a restart command signal and a stop command signal for engine 100 are sent to engine ECU

3000, from which the sensor signal is sent to eco run ECU 2000. Engine ECU 3000 sends a restart signal to starter 200 based on the restart command signal for engine 100 received from eco run ECU 2000. Starter 200 in turn cranks engine 100, whereby engine 100 is restarted.

The conditions of stopping engine 100 in this eco run system include, for example, that the accelerator pedal position is zero, one or more seconds have elapsed after the shift operation, the vehicle speed is 0 km/h, the engine speed is not more than 1000 rpm, the degree of upslope/downslope is not more than 8°, the temperature of the engine coolant is between 65° C. and 105° C., the battery temperature is between 0° C. and 55° C., the brake master pressure is at least of a level that can ensure sufficient braking force, the steering wheel is not operated immediately before the engine is stopped, and the like, all of which are to be satisfied. Note that the types and values of these conditions are only an example.

Figure 2:
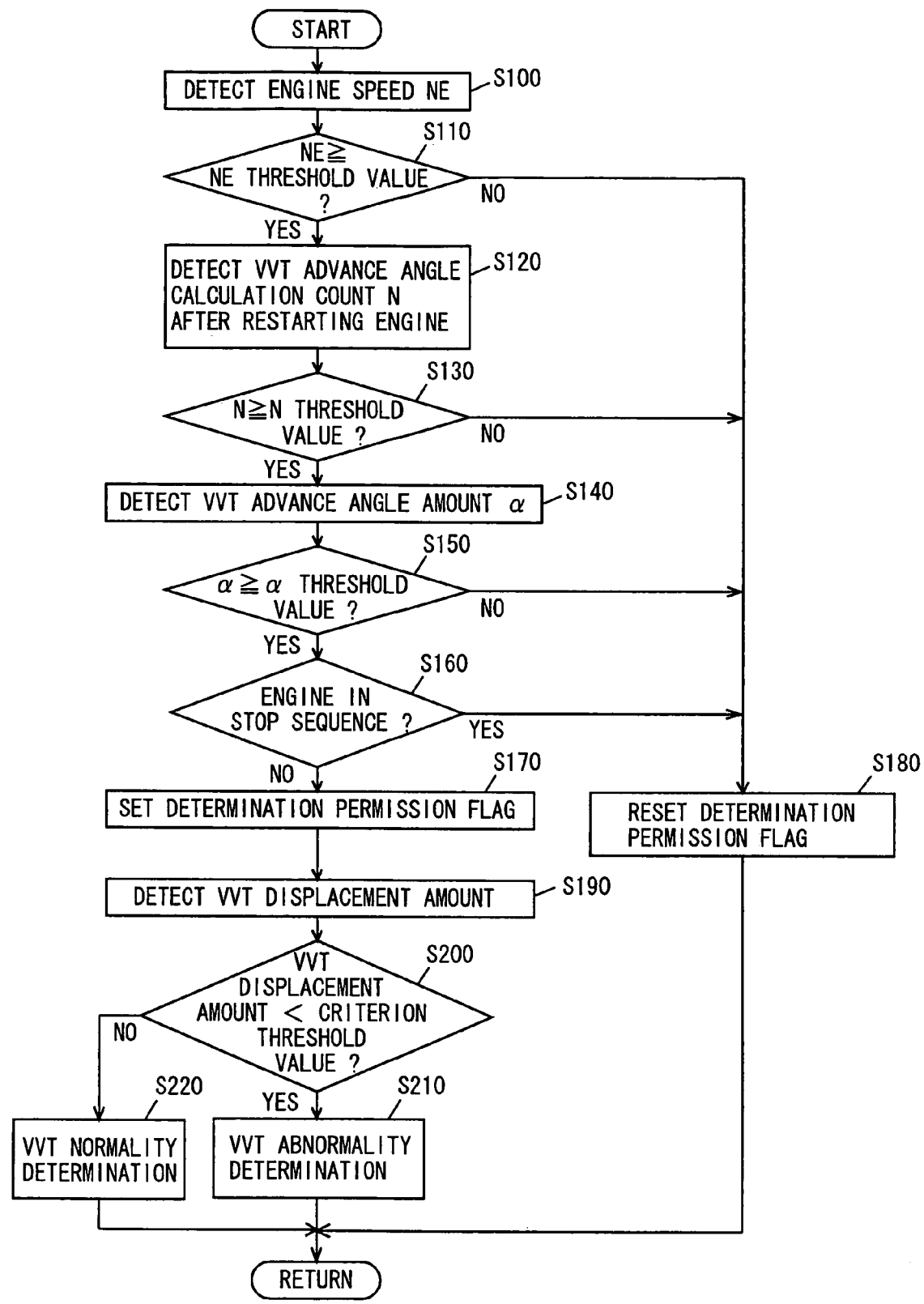
FIG. 2 is a flowchart showing a control structure of a VVT abnormality detecting program executed in an ECU in FIG. 1.

Referring to FIG. 2, a control structure of a program executed in engine ECU 3000 in FIG. 1 will be described.

In step (hereinafter abbreviated as S) 100, engine ECU 3000 detects engine speed NE based on a signal input from NE sensor 3300. In S110, engine ECU 3000 determines whether the detected engine speed NE is at least an NE threshold value which is a predetermined threshold value for engine speed NE. If engine speed NE is at least the NE threshold value (YES in S110), the process proceeds to S120; otherwise (NO in S110), the process proceeds to S180.

In S120, engine ECU 3000 detects a VVT advance angle calculation count N after restarting engine 100. In S130, engine ECU 3000 determines whether VVT advance angle calculation count N after restarting the engine is at least the N threshold value or not which is a predetermined threshold value for a VVT calculation count. If VVT advance angle calculation count N after restarting the engine is at least the N threshold value (YES in S130), the process proceeds to S140; otherwise (NO in S130), the process proceeds to S180.

In S140, engine ECU 3000 detects a VVT advance angle amount α. VVT advance angle amount α is a value calculated by an operation within engine ECU 3000. In S150, engine ECU 3000 determines whether VVT advance angle amount α is at least an α threshold value which is a predetermined threshold value for VVT advance angle amount α. If VVT advance angle amount α is at least the α threshold value (YES in S150), the process proceeds to S160; otherwise (NO in S150), the process proceeds to S180.

In S160, engine ECU 3000 determines whether engine 100 is currently in a stop sequence or not. If engine 100 is in the stop sequence (YES in S160), the process proceeds to S180; otherwise (NO in S160), the process proceeds to S170.

In S170, engine ECU 3000 sets a determination permission flag. In S1180, engine ECU 3000 resets the determination permission flag. Note that a determination inhibition flag may be reset in S170 and the determination inhibition flag may be set in S180 instead.

In S190, engine ECU 3000 detects a VVT displacement amount. The VVT displacement amount is detected based on the cam position signal input from VVT controller 3500 to engine ECU 3000. In S200, engine ECU 3000 determines whether the detected VVT displacement amount is less than a predetermined criterion threshold value for determining that VVT controller 3500 is abnormal. If the VVT displacement amount is less than the criterion threshold value (YES in S200), the process proceeds to S210; otherwise (NO in S200), the process proceeds to S220. The process in S200 may be performed, using a time differential value of the VVT displacement amount instead of the VVT displacement amount itself. In other words, if the change per unit time in the cam position signal of VVT controller 3500 is less than the criterion threshold value, the process proceeds to S210.

In S210, engine ECU 3000 determines that the VVT is abnormal. In S220, engine ECU 3000 determines that the VVT is normal.

An operation of the VVT abnormality detecting process, based on the above-described structure and flowchart, in the vehicle on which engine ECU 3000 is mounted that realizes the abnormality detecting device according to the present embodiment will be described.

After temporarily stopping and then restarting the engine of the eco run vehicle, engine speed NE is detected (S100). If engine speed NE is at least the NE threshold value (YES in S110), VVT advance angle calculation count N after restarting the engine is at least the predetermined N threshold value (YES in S130), VVT advance angle amount a is at least the predetermined a threshold value (YES in S150), and the engine is not in the stop sequence (NO in S160), a VVT abnormality determination permission flag is set (S170).

On the other hand, if engine speed NE is lower than the predetermined NE threshold value (NO in S110), VVT advance angle calculation count N after restarting the engine is less than the predetermined N threshold value (NO in S130), VVT advance angle amount α is less than the predetermined a threshold value (NO in S150), or the engine is in the stop sequence (YES in S160), the determination permission flag is reset (S180).

If the determination permission flag is in a set state (S170), the VVT displacement amount is detected (S190). If the VVT displacement amount is less than the criterion threshold value provided for abnormality determination (YES in S200), the VVT is determined to be abnormal (S210). On the other hand, if the VVT displacement amount is at least the criterion threshold value (NO in S200), the VVT is determined to be normal (S220).

As described above, according to the abnormality detecting device of the present embodiment, in the case of the vehicle such as an eco run vehicle and a hybrid vehicle which frequently stops and restarts the engine, the engine may be stopped in the compression stroke. In this case, the pistons may be pushed back by compressed air to slightly rotate the crankshaft in the reverse direction. Even in this case, since the camshaft is not rotated, the cam phase appears as if it advances, in which case when the VVT controller is outputting an advance angle command value, performing the VVT abnormality determination cannot allow abnormality detection. Therefore, in the abnormality detecting device according to the present embodiment, the VVT abnormality determination is permitted or inhibited based on the engine speed, the VVT advance angle calculation count after restarting the engine and the VVT advance angle amount, and also based on whether the engine is in the stop sequence or not, and the like. As a result, in case other than when the crankshaft and the camshaft are not synchronized with each other, the VVT abnormality determination can be performed. Consequently, VVT abnormality can be accurately detected in the vehicle such as an eco run vehicle in which the engine is repeatedly stopped and restarted.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:
1. An abnormality detecting device of a vehicle that temporarily stops an engine when a state of the vehicle satisfies a predetermined condition, said engine being provided with a variable valve timing mechanism, comprising:
  a cam position sensor that detects a cam phase and outputs a cam position signal; and
  an ECU, wherein:
  the ECU determines whether an abnormality detection inhibiting condition relating to a predetermined state of said engine is satisfied or not after said engine is temporarily stopped and then restarted;
  the ECU detects an abnormality of said variable valve timing mechanism based on said cam position signal, and the abnormality of said variable valve timing mechanism being an abnormality of a variable valve timing;
  the ECU inhibits detection of an abnormality of said variable valve timing mechanism when said abnormality detection inhibiting condition is satisfied,
  said abnormality detection inhibiting condition including a condition of engine speed being lower than a predetermined engine speed.

2. The abnormality detecting device of the vehicle according to claim 1, wherein
  said abnormality detection inhibiting condition includes, a condition of an output count of a control command to said variable valve timing mechanism being lower than a predetermined count after said engine is restarted.

3. The abnormality detecting device of the vehicle according to claim 1, wherein
  said abnormality detection inhibiting condition includes, a condition of a displacement amount in the control command to said variable valve timing mechanism being less than a predetermined amount after said engine is restarted.

4. The abnormality detecting device of the vehicle according to claim 1, wherein
  said abnormality detection inhibiting condition includes, a condition of said engine currently being in a stop sequence.

5. An abnormality detecting device of a vehicle that temporarily stops an engine when a state of the vehicle satisfies a predetermined condition, said engine being provided with a variable valve timing mechanism, comprising:
  a cam position sensor that detects a cam phase and outputs a cam position signal;
  an ECU, the ECU including:
  means for determining whether an abnormality detection inhibiting condition relating to a predetermined state of said engine is satisfied or not after said engine is temporarily stopped and then restarted;
  means for detecting an abnormality of said variable valve timing mechanism based on said cam position signal, and the abnormality of said variable valve timing mechanism being an abnormality of a variable valve timing;
  means for inhibiting detection of an abnormality of said variable valve timing mechanism by said means for detecting when said abnormality detection inhibiting condition is satisfied according to said means for determining, wherein
  said abnormality detection inhibiting condition includes a condition of engine speed being lower than a predetermined engine speed.

6. The abnormality detecting device of the vehicle according to claim 5, wherein
  said abnormality detection inhibiting condition includes, a condition of an output count of a control command to said variable valve timing mechanism being lower than a predetermined count after said engine is restarted.

7. The abnormality detecting device of the vehicle according to claim 5, wherein
  said abnormality detection inhibiting condition includes, a condition of a displacement amount in the control command to said variable valve timing mechanism being less than a predetermined amount after said engine is restarted.

8. The abnormality detecting device of the vehicle according to claim 5, wherein
  said abnormality detection inhibiting condition includes, a condition of said engine currently being in a stop sequence.

* * * * *